H. A. TILDEN.
Making Vinegar.
No. 83,423.
Patented Oct. 27, 1868.
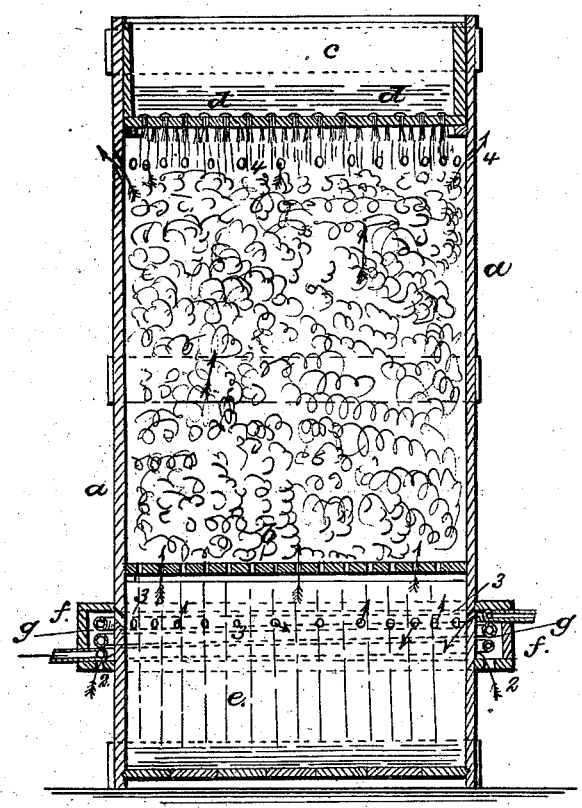

HENRY A. TILDEN, OF NEW LEBANON, NEW YORK.

Letters Patent No. 83,423, dated October 27, 1868.

IMPROVEMENT IN THE MANUFACTURE OF VINEGAR.

The Schedule referred to in these Letters Patent and making part of the same.

*To all whom it may concern:*

Be it known that I, HENRY A. TILDEN, of New Lebanon, in the county of Columbia, and State of New York, have invented, made, and applied to use, a certain new and useful Improvement in the Manufacture of Vinegar; and I do hereby declare the following to be a full, clear, and exact description of the said invention, reference being had to the annexed drawing, making part of this specification, wherein I have represented a vertical section of the acidifying-apparatus made use of by me.

The object of this invention is to make vinegar from corn or other vegetable materials, in a rapid and reliable manner, and at the same time to produce a very superior article.

I make a sirup from corn, as described in Letters Patent granted to me, July 25, 1865, and then dilute the same with the desired quantity of water, and allow the same to remain in proper vats until sufficiently fermented to become slightly acid. I then filter the same through a filter of sand and charcoal or animal black, such as set forth in Letters Patent granted to me, July 25, 1865, No. 49,013, and the liquid is ready for being converted into vinegar in the apparatus next described.

I remark that the filtration might be performed after the vinegar has been made, but I prefer to filter the liquid previously; and if, in the process of fermenting the sirup, it is desired to aid the operation by chemical ingredients or otherwise, it may be done.

My apparatus is especially adapted to making vinegar from corn-sirup, as aforesaid, but it will operate upon any ordinary acidulated liquid used in the production of vinegar.

Heretofore it has been usual to place the vat containing shavings in a building or room, and to keep that room at the desired temperature for acidifying the liquid. This involves considerable expenditure of fuel, particularly in cold weather, and it is difficult to properly regulate such temperature.

The nature of my present invention consists in means for regulating the temperature of the air in the acidifying-vat, by the introduction of currents of warm air, near the bottom thereof, and allowing the same to escape near the top, so that the proper heat is maintained for producing vinegar, and the contact of the air with the liquid facilitates the operation, and concentrates the vinegar by the evaporation.

In the drawing, $a$ represents a vat, of any desired size or shape. $b$ is a partition therein, that is perforated, and supports the mass of shavings, or similar material, over which the acidulated water trickles from the cistern $c$, the bottom of which is perforated, and provided with strainers, of cotton-wicking or similar material, introduced in the openings at $d$.

$e$ is a chamber below the partition $b$, into which the vinegar runs, and from which it is to be drawn off by any suitable pipe or faucet.

Around the vat $a$, I form a jacket, $f$, in the bottom of which are holes 2 2, and from which jacket holes 3 3 pass into the chamber $e$. These holes 3 3 are to be inclined upwards, to prevent the vinegar running out of the vat $a$.

Within the jacket $f$, I place a steam-coil, $g$, so that the heat of the air that passes in at the holes 2 and 3 may be regulated as desired.

The arrows represent the currents of air.

Openings are allowed for the escape of the warm air. For this purpose I have shown the holes at 4 4.

It will be understood that the quantity of vinegar produced will depend upon the size of the apparatus, and the extent to which it is converted into vinegar will be according to the time it is exposed to the action of the air.

A very pure and uniform quality of vinegar will be made by my means before described.

What I claim, and desire to secure by Letters Patent, is—

The jacket $f$ around the vat $a$, with the openings 2 and 3, in combination with the heating-coil $g$, as and for the purposes set forth.

In witness whereof, I have hereunto set my signature, this 10th day of July, A. D. 1868.

H. A. TILDEN.

Witnesses:
CHAS. H. SMITH,
GEO. T. PINCKNEY.